United States Patent Office 3,110,701
Patented Nov. 12, 1963

3,110,701
COPOLYMERIC COMPOSITION
Robert L. Wear, West St. Paul, Minn., assignor to Minnesota Mining and Manufacturing Company, St. Paul, Minn., a corporation of Delaware
No Drawing. Filed June 16, 1960, Ser. No. 36,490
11 Claims. (Cl. 260—79.3)

This invention relates to thermally curable polymeric compositions and more particularly to copolymers of poly(benzosulfimido) group-containing compounds with amines.

It is known that saccharin will react with amines, but so far as can be determined such reactions as heretofore known do not produce useful polymeric or resinous products.

It is an object of this invention to provide polymeric compositions. Another object of the invention is to provide copolymers of saccharin derivatives with polyfunctional amines. A further object is to provide compositions which are cured rapidly at elevated temperatures to produce useful polymers. A still further object is to provide compositions especially suitable for producing coatings by curing them in place on a surface. Other objects of the invention will become evident hereinafter.

In accordance with the above and other objects of the invention it has been found that thermosetting compositions which are curable to form useful copolymers are obtained by combining and blending certain compounds containing a plurality of benzosulfimido groups and polyfunctional primary aliphatic amines. The thermally curable compositions of the invention are stable and remain in an unreacted state almost indefinitely at ordinary temperatures and for prolonged periods at elevated temperatures, but are triggered by heating to fairly well-defined higher temperatures and then cure very rapidly with little if any induction period, to form copolymers which have useful properties. Thus the curable compositions of the invention are pre-eminently suited for thermosetting curing with very short heating times. They permit application of coatings having excellent resistance to chemical and corrosive action to materials having limited time-tolerance to elevated temperatures such as fabrics and other materials of organic character. The compositions of the invention can be applied as powders; for example, to a cloth-insulated wire, then heated very rapidly to provide a novel "varnished cambric" type of insulation possessing useful electrical properties. They are also applicable directly to metals to provide tough, adherent uniform coatings possessing excellent resistance to corrosion.

If desired, pigments, fillers and other solid and liquid materials may be compounded with the compositions of the invention to produce desired changes in properties of the copolymers. For example, a magnetic powdered metal may be included to provide a magnetic shielding coating for components of electronic circuits. Pigments, fillers, plasticizers and the like can also be added to the mixture before curing. It will readily be apparent to the art that such materials and others can be added to the basic compositions of the invention and such augmented compositions will be within the scope of the invention.

Broadly speaking, the copolymers of the invention can be described as the reaction products of organic compounds which are polyfunctional in terms of benzosulfimido groups and which are otherwise inert, with polyfunctional primary aliphatic amines. For convenience, inasmuch as the systematic naming of such compounds becomes highly involved and requires extremely long names, the term "disaccharyl" is used to define that class of compounds in which two or more benzosulfimido residues are connected at the nitrogen atoms thereof through a linking group which is a substantially inert organic chain. The disaccharyl compounds useful in the copolymers of the invention can be represented by the formula:

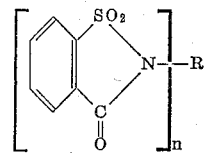

wherein $n$ is an integer greater than one and R is an $n$-valent linking group containing from 3 to 12 carbon atoms selected from the group consisting of alkylene, oxaalkylene and aralkylene radicals.

Exemplary compounds of this type are the following:

1,3-bis saccharino propane
1,4-bis saccharino butane
1,10-bis saccharino decane
1,8-bis saccharino-3,6-dioxaoctane
1,3-bis(3-nitro saccharino) propane
1,4-bis(saccharino methyl)benzene
2,4-dimethyl-1,5-bis(saccharino methyl)-benzene
2,3,5,6-tetramethyl-1,4-bis(saccharinomethyl)-benzene
1,2,4,5-tetra(saccharinomethyl)-benzene and the (poly) N-glycidyl saccharin represented by the formula:

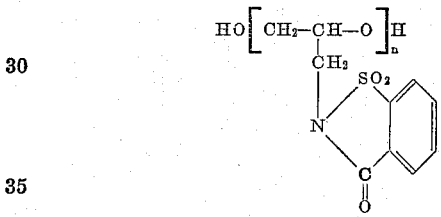

wherein $n$ is at least 2, and which may be conveniently referred to as polyglycidylsaccharin.

Although certain of the disaccharyl compounds employed as comonomers in the present invention have been known heretofore, they have not been widely available. Broadly speaking, they are prepared by reacting a polyhalide embodying the n-valent linking radical R with a solution of the sodium salt of saccharin in dimethylformamide at elevated temperatures for a period of time until condensation of the saccharin with the polyhalide is substantially complete as evidenced by precipitation of the sodium halide formed in the reaction, followed by recovery of the disaccharyl compound from solution. In general any di- or polyhalo compound in which no two halogen atoms are attached to the same carbon atom and the halogens are not in tertiary position, are suitable as starting materials; for example:

1,2,3-trichloropropane
1,3-dibromopropane
1,4-dichlorobutane
1-bromo-10-chlorodecane
1,8-dibromo-3,6-dioxaoctane
1,4-xylylene dichloride
2,4-dimethyl-1,5-xylylene dichloride
2,3,5,6-tetramethyl-1,4-xylylene dichloride durene tetrachloride and the like.

Such intermediates in which the halogens occupy primary positions are preferred. The disaccharyl compounds often crystallize from their solutions in dimethylformamide on cooling and can be isolated by filtration, and washed with water to remove concomitant sodium halide. Alternatively they are precipitated as white solids merely by addition of water, filtered off, washed with water and dried.

The polyfunctional primary aliphatic amines which are useful as comonomers and curing agents in the compositions of the invention are those organic amines which contain two or more, preferably from 2 to 4, aminomethyl groups. The primary amine function is thus attached to the residue of the compound through a methylene group. These amino groups are the essential portion of the curing agents, and it is only necessary that the residue of the curing agents be free from functional groups containing active hydrogen atoms which will react with the amino groups which are present, e.g., as by zwitterion formation. Thus, sulfonic and carboxylic acid groups should be excluded from those curing agents. These compounds may also be characterized by the formula:

$$R_1(NH_2)_m$$

wherein $m$ is an integer from 2 to 4, $R_1$ is an $m$-valent radical connected to the amino groups through methylene radicals, and is selected from the group consisting of aliphatic, aromatic and heterocyclic radicals, the said $m$-valent radical being free from functional groups containing active hydrogen atoms which will react with amino groups.

Among the polyfunctional aliphatic amines useful as curing agents or comonomers in the present invention are the polyalkylene polyamines, such as ethylene diamine, diethylenetriamine, triethylenetetramine, tetraethylenepentamine, trimethylenediamine, tetramethylenediamine, pentamethylenediamine, hexamethylenediamine, metaxylylenediamine, etc.

Another group of polyfunctional amines which are useful for the purposes of the present invention are the various polyfunctional aliphatic amines which are derived from low polymers of unsaturated fatty acids.

It appears that polymerization of the unsaturated fatty acids takes place by inter-molecular condensation at the double bonds. The resulting low polymers generally comprise dimers and trimers, although tetramers of higher polymers can also be formed. Although these polymers have extremely complex structures which are not known with particularity, postulated structures of the dimer and the trimer of linoleic acid, which indicate possible structures of these low polymers in general, are as follows:

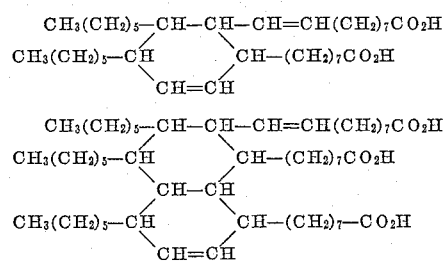

The preparation of such polymeric polyene fatty acids is described in United States Patents 2,484,761, 2,373,015 and 2,435,478.

The low molecular weight polymers of polyene fatty acids can be reacted with polyfunctional aliphatic amines to form higher molecular weight materials which contain aliphatic amine and amide functional groups. A postulated structure for a product of this type (the reaction product of the dimer of linoleic acid and ethylene diamine) is as follows:

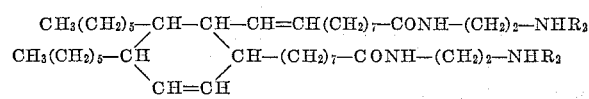

wherein $R_2$ is hydrogen or another linoleic acid dimer group. Resins of this general type are disclosed in United States Patent 2,450,940. Amine-terminated polyamides of this type are available commercially under the registered trademark "Versamid." Among the products produced by the condensation of polycarboxylic acids with polyamines, are "Versamid" 100, a soft, tacky resin that is semisolid at room temperature, which melts at 43–53° C. and which has an amine value of 83–93, "Versamid" 115, a viscous liquid resin at room temperature which has a viscosity at 40° C. of approximately 500–750 poises (on a Brookfield viscometer using a No. 6 spindle and revolving at 4 r.p.m.) and an amine value of 210–230; "Versamid" 125, a fluid resin at room temperature which is reported to have a viscosity at 40° C. of approximately 80–120 poises (on a Brookfield viscometer using a No. 6 spindle and revolving at 4 r.p.m.) and an amine value of 290–320; and "Versamid" XD–140, derived from dimeric polyene higher fatty acids of the type described hereinabove, which is a liquid at room temperature which has a viscosity at 25° C. of approximately 130±30 poises (on a Brookfield viscometer using a No. 6 spindle and revolving at 4 r.p.m.) and an amine value of approximately 325–360. Such polyfunctional amines contain up to 72 carbon atoms, for example, when the hexamethylene diamine derivative of the trimer of linoleic acid is used, or more.

Polyfunctional aliphatic amines which contain no amide groups can be prepared from the polymerized polyene fatty acids, for example, by dehydration of the ammonium salt of the acid followed by hydrogenation of the resulting amide, during which the residual unsaturation may be partly or wholly removed. A postulated structure for a product of this reaction is exemplified by the following:

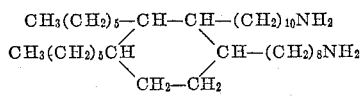

Polyfunctional amines of this type, which can be obtained commercially under the trademark "Emery" amines, are "Emery 3154–R" amine, a liquid resin at room temperature which has an amine value of approximately 177; and "Emery 654–27–R" amine, which is also liquid at room temperature and which has an amine value of approximately 155. These and the above amide group-containing polyfunctional aliphatic amines can be designated generically as polyfunctional aliphatic amines derived from low polymers of higher fatty acids.

The easily available polyfunctional aliphatic amines which contain relatively low concentrations of amine functional groups, e.g. the "Versamid" and "Emery Amine" products which are substantially liquid, that is, liquid or semi-solid at ordinary temperatures lend themselves to easy mixing with disaccharyl compounds, particularly when the latter are finely divided. Mixtures of polyfunctional aliphatic amines, including the amines derived from fatty acid polymers, can be used if properties intermediate of two of them are desired, and in fact the commercially available products are ordinarily mixtures and commonly contain an amount of unpolymerized material, but this does not destroy their utility for use in the present invention.

In addition to the polyfunctional aliphatic amines set forth above, polyfunctional amines containing alicyclic groups, such as menthane diamine and polyfunctional amines containing arylene groups, such as m-xylylene diamine, are also useful as components in preparing the curable compositions and copolymers of the invention.

Especially useful incipiently curable compositions having decreased flammability and which are powdery in nature can be prepared using disaccharyl compounds and tri-amines having very low volatility at elevated temperatures.

Triamines having complex structures and having very low volatility and excellent stability are formed by reaction of alkylene diamines or oxaalkylene diamines with triphenyl cyanurate. Reaction is most conveniently effected by reaction of an excess of the selected diamine, for example, hexamethylene diamine, 4,7-dioxadecylene diamine, m-xylylene diamine or the like, with triphenyl cyanurate, followed by removal of the phenol which is formed in the reaction together with any unreacted diamine. These complex triamines are amorphous materials which commonly appear to be brittle solids or viscous liquids at room temperature. They possess characteristic chemical properties of amines, such as the formation of salts with dilute acids, but lack the volatility and odor commonly associated with amines. So far as can be determined, they have virtually no vapor pressure at least up to 150° C. and are very valuable not only in the compositions of the present invention but also for curing other prepolymers such as epoxy resins. For use in the compositions of the invention, the solids are reduced to finely divided form and mixed with the selected disaccharyl compound. When an oxaalkylene diamine is used in the preparation of these complex amines, the cured leads to the formation of amine-terminated copolymers which can be represented by the formula:

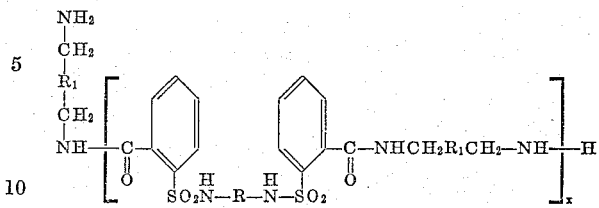

wherein R and $R_1$ have the above significance and $x$ is a number indicating the number of repeating units in the polymer, which may be as low as about 5 units, but preferably is higher in order to provide more useful physical properties.

In a similar manner, when there is a slight excess of the disaccharyl, the resulting benzosulfimido group-terminated copolymer structure can be represented by the formula:

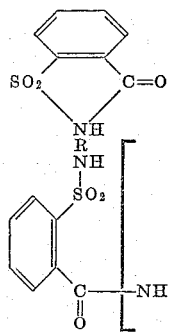
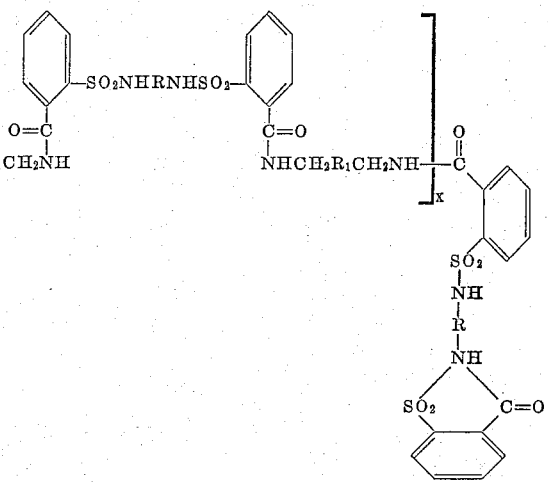

polymers produced by heating the compositions are found to have greater flexibility.

Certain alicyclic polyamines, such as bis (4-aminocyclohexyl)-methane and the like, and heterocyclic secondary amines such as piperazines, behave like the polyfunctional primary aliphatic amines described herein, with respect to copolymerization with the disaccharyl compounds of the invention, and are to be considered as equivalents for the purposes of the invention.

The thermosetting compositions of the invention are generally prepared by combining and blending to a homogeneous mixture approximately stoichiometric amounts of the selected disaccharyl and the polyfunctional primary aliphatic amine. The solid materials are powdered to ensure uniform distribution. A slight excess of either ingredient, that is to say up to 60:40 mole percent ratios, may be employed; for example, when it is desired that the cured resin be receptive to chemical bonding to a further reactive substance such as an isocyanate or an epoxy resin. In general, greatest resistance to chemical attack or corrosion in the cured copolymer is provided by compositions in which stoichiometric proportions are most closely approached. When mole percent is referred to herein in connection with the proportions of comonomers, it is understood that stoichiometric ratios are meant, since the significant parts of the molecules from this standpoint are the functional groups.

The reaction between the disaccharyl compounds and a slight excess of a difunctional primary aliphatic amine ($m=2$ in the general amine formula above) apparently wherein R, $R_1$ and $m$ have the same significance as hereinabove.

When polyfunctional amines of higher orders, i.e. $m>2$, are used it will be evident that extensive combining of the polymers will occur on curing to give extremely complex crosslinked structures by the same principles as those above, but which cannot conveniently be shown by formulae. It is of course apparent to the art that in copolymers of the type described herein $x$ is commonly a number representing the average of the chain lengths of the copolymers.

Now, having described the compositions of the invention in broad terms, they are now more specifically described and illustrated by examples intended to show the best mode presently contemplated of practicing the invention. In these examples, all parts are by weight unless otherwise indicated.

*Example 1*

This example illustrates the preparation of disaccharyl compounds, using dimethyl formamide as the reaction medium.

To a solution of 117 parts (0.57 mole) of sodium saccharin in 200 parts by volume of dimethyl formamide are added 45 parts (0.26 mole) of p-xylylene dichloride and the mixture is stirred under reflux (about 155° C.) for 6 hours. The sodium chloride formed in the reaction precipitates during this time. The reaction mixture is cooled and the salt, together with the 1,4-bis-saccharinomethyl benzene product which crystallizes are separated from the reaction mixture by filtration and washed with water to remove the sodium chloride. The residual white crystalline 1,4-bis saccharinomethyl benzene is dried. It melts above 300° C.

To a solution of 267 parts (1.3 moles) of sodium saccharin in 400 parts by volume of dimethyl formamide are added 70 parts of 1,4-dichlorobutane and the mixture is stirred and heated at about 120° to 150° C. for 20 hours. The hot reaction mixture is filtered to remove the salt which precipitates during this time and the filtrate is then cooled to about 0° to 5° C. 1,4-bis saccharino butane crystallizes and is collected by filtration, washed with water and dried. It melts at about 200° C. (204° to 206° C. reported by J. V. Braun and G. Lemke in Berichte der Deutschen Chemischen Gesellschaft, vol. 55, page 3535, 1922.

When the above procedure is repeated using amounts of from about one half to twice the given amount of dimethylformamide as solvent for the sodium saccharin, substantially identical results are obtained. With larger amounts the yield of bis-saccharinobutane is somewhat decreased because of the slight solubility thereof. In general, a ratio of about 2 parts by weight of dimethylformamide to one part by weight of sodium saccharin is preferred, but ratios from about 1:1 to 5:1 or higher can be used with equal success. The polyhalo compound is preferably used in an amount which is about 10 mole percent less than the stoichiometric amount to ensure that the disaccharyl derivative is formed, but other proportions may be employed. In general a range of about 80 to 90% of the stoichiometric molar amount is preferred. Any excess of saccharin or saccharin salt is readily removed by washing.

The above described procedure is repeated, in each case using about 10% less than the stoichiometric amount with each of the following polyhalo compounds:

(A) 1,3-dichloropropane
(B) 1,8-dichloro-3,6-dioxaoctane
(C) 2,4-dimethyl-1,5-xylylene dichloride
(D) 2,3,5,6-tetramethyl-1,4-xylylene dichloride
(E) Tetrachlorodurene (in admixture with some trichlorodurene)

and the respective resulting products which are obtained are characterized as follows:

| Lot | | M.P. (°C.) | Analysis: percent N | |
|---|---|---|---|---|
| | | | Calc'd | Found |
| A | 1,3-bis-saccharino-propane | 220 | (¹) | (¹) |
| B | 1,8-bis-saccharino-3,6-dioxaoctane | ca 150 | 5.83 | 5.96 |
| C | 2,4,dimethyl-1,5-bis(saccharino methyl)benzene | 280 | 5.64 | ² 5.52 |
| D | 2,3,5,6-tetramethyl-1,4-bis (saccharino methyl)benzene | >300 | 5.34 | 5.26 |
| E | 1,2,4,5-tetra(saccharinomethyl) benzene | >300 | 6.52 | ³ 6.51 |

¹ Not determined.
² Calculated: H, 4.0%; C, 58.0%. Found: H, 4.2%; C, 57.3%.
³ Calculated: H, 3.0%; C, 53.2%. Found: H, 3.2%; C, 53.2%.

*Example 2*

This example illustrates the process involving reaction of saccharin salts with a polyhalide compound where the reaction product is soluble in the reaction mixture.

To a solution of 135 parts (0.66 mole) of sodium saccharin in 200 parts by volume of dimethyl formamide are added 66 parts (0.6 gram atom of chloride atoms) of polymeric epichlorohydrin having an average molecular weight of about 900 (available commercially as Polyglycol 166–900) and the mixture is stirred and refluxed for 16 hours. The salt which precipitates is removed by filtration after cooling the reaction mixture, and the product is precipitated from the solution by pouring the filtrate slowly into about 1500 parts of thoroughly agitated water. The white solid is collected and air-dried. Polyglycidyl saccharin thus prepared melts at about 100° to 110° C. and is a substantially white powder.

*Analysis.*—Calculated (based on original chlorine content of 32.3%): percent N, 5.46. Found: Percent N, 5.45.

*Example 3*

This example illustrates the formation of a complex trifunctional primary amine from triphenyl cyanurate.

A mixture of 236 parts of hexamethylenediamine and 80 parts of triphenyl cyanurate is placed in a vessel equipped with condenser, thermometer and mechanical agitator. The mixture is heated and stirred for 5 hours at 200° C. The vessel is fitted for vacuum distillation and is stripped at 210° C. under less than 1 mm. Hg pressure for 2 hours to remove phenol. The residual amber colored solid can be referred to as tris (6-aminohexylamino) triazine.

When the procedure is repeated using 408 parts of metaxylylenediamine and 107 parts of triphenyl cyanurate, an amber-colored hard solid melting at about 100° C. is obtained. The 1,3,5-(metaaminomethyl benzylamino) triazine has N.E. 173, determined by titration with perchloric acid in chloroform.

The above-described procedure is repeated (minor variations occur in the initial reflux temperature), using ethylenediamine, 1,4-butylene diamine, and N-aminoethyl piperazine. The respective products are obtained as rather brownish semi-solids at room temperature, and are tris(2-aminoethylamino)triazine, tris (4-aminobutylamino)triazine, and tris (N'-piperazylethylamino) triazine, respectively.

*Example 4*

A mixture of 182 parts (0.6 equivalent) of Emery Trimer acid 3055-S (a commercially available trifunctional acid believed to correspond approximately to the structure of trimerized linoleic acid, as hereinabove described) and 70 parts (0.6 mole) of hexamethylenediamine is heated and stirred for 2 hours with water removal facilitated by means of a steam jacketed condenser. The tris-N-(aminohexyl) trisamide of the trimer acid is thus produced as a soft, rather tacky solid residue. The molecular weight is such that there is approximately one gram atom of primary amino groups (16 g.) in 400 grams. The procedure is repeated employing 106 parts of 4,7-dioxa-decanediamine, to produce the tris-N-(10-amino-4,7-dioxa-decyl)-trisamide of the trimeric linoleic acid as a rather soft tacky solid.

*Example 5*

This example illustrates the use of the compositions of the invention in a fluidized-bed coating operation.

A mixture of 31.5 parts of the 1,4-bis-(saccharino) butane of Example 1 and 34.8 parts of the tris (3-aminomethyl-benzylamino)triazine of Example 3 is blended together by grinding in a ball mill for about 2 hours at about 50° C., to produce a finely powdered composition of the invention which is then screened to pass a 200 mesh sieve. Such compositions are particularly suited for use in a fluidized-bed coating operation.

The fluidized-bed is established by placing the —200 mesh powder in an upright cylinder in a bed about 3 inches deep, through which air is forced under low pressure in amount just sufficient to produce gentle agitation of the powder. Strips of clean 63 mil aircraft-type aluminum metal 1 inch by 4 inches in size are heated to 400° F. in an oven and immediately on removal and while still hot are immersed in the fluidized bed. The particles contacted by the hot metal sinter and adhere to the metal when it is withdrawn producing a rough coating of the incompletely reacted thermosetting compositions. These strips are then placed in an oven at 450° F. for 15 minutes so supported as to avoid contact of the larger surfaces with each other or with surfaces of the oven or trays. When removed the coating is found to be completely polymerized and to be hard and glossy. Immersion of the strips in aqueous 20% hydrochloric acid (by weight), for 18 days at 25° C., aqueous 20% (by weight) potassium hydroxide for 18 days at 25° C. and a brine solution approximating the composition of sea-water for 18 days at 26° C. results in no deterioration of the coating or attack of the metal, thus showing the imperviousness of the coating and its freedom from pinholes. The coatings are not softened or dissolved by immersion in toluene or phosphate ester (Skydrol 500 hydraulic fluid) during the same period.

Laminar and non-laminar shapes, e.g. wires, rods, bars of aluminum and other metals can be coated similarly. For example, mumetal shapes for incorporation in a magnetic recording head can be coated and subsequently assembled and cured under pressure to give a firmly bonded magnetic recording head. Adhesion to alloys other than amalgams is also excellent.

Example 6

When compositions are prepared as in Example 5 above, blending together the proportions shown in Table 1 of disaccharyl compounds (Examples 1 and 2) and trifunctional amines (Example 3) other compositions of the invention designated lots A, B, C, D, E and F are obtained. The compositions form pasty, semifluid masses which can be molded in a die under moderate pressure and cured in the same die at the temperature shown.

TABLE 1

| Lot | Material | Parts | Curing Temperature, °C. |
|---|---|---|---|
| A | 1,4-bis(saccharino methyl)-benzene | 4.7 | 155 |
|   | tris(N'-aminoethylpiperazyl)triazine | 3.1 |  |
| B | 1,8-bis(saccharino-3,6-dioxaoctane | 2.4 | 155 |
|   | tris(2-aminoethylamino) triazine | 0.9 |  |
| C | 1,3-bis-saccharino-propane | 2.0 | 155 |
|   | tris(6-aminohexylamino)-triazine | 1.5 |  |
| D | 1,2,4,5-tetrasaccharinomethylbenzene | 9.3 | [1] 155; 180 |
|   | tris(6-aminohexylamino)-triazine | 6.9 |  |
| E | 2,3,5,6-tetramethyl-1,4-bis(saccharino-methyl) benzene. | 5.2 | [1] 155; 180 |
|   | tris(2-aminoethylamino) triazine | 1.8 |  |
| F | 2,4-dimethyl-1,5-bis(saccharino-methyl) benzene. | 5.0 | [1] 155; 180 |
|   | tris(4-aminobutylamino) triazine | 2.4 |  |

[1] Cured at 155° C. for about 2 hours at 155° C. followed by heating at 180° C. for about 4 hours.

It is found that the curability of certain compositions of the invention is potentiated by treatments or additions which tend to promote fluidity of the mixtures for example, warming or dissolving the materials in a solvent. While normally the blended compositions even though finely divided have prolonged shelf life and stability at room temperature, it is possible to produce solutions of such compositions using disaccharyl compounds melting below about 250° C. which cure slowly at room temperature or more rapidly if, after evaporation of solvent, they are warmed or heated briefly. Such compositions and the method of potentiation are illustrated by the following examples.

Example 7

A mixture of 10.5 parts of finely ground 1,4-bissaccharinobutane of Example 1 (containing one equivalent of saccharin residues in 210 grams) and 20 parts of the tris-N-(aminohexyl)trisamide of trimer acid of Example 4 is blended together by heating to flowable consistency and stirring and kneading. The resultant material is rather stiff and putty-like at room temperature. It has a shelf life of at least 3 months when not further treated and can be cured by heating to 120° C. for 2 hours. A portion of this mixture to which is added about 3% of tris-(dimethylamino)phenol is warmed to 50° C. to promote fluidity and to potentiate the curability and is coated on one side of a strip of a commercially available non-woven polyester web (using a spatula). The unilateral coating is cured at 300° F. for 30 minutes and a similar coating is applied to the other side and cured similarly. The resultant construction is tack-free and flexible and has an electrical dissipation factor of 19% at room temperature. It can be used as an insulating spacer or gasket material.

A further portion of the above material is coated on the two sides of a glass fiber mat using preheated coating bars and the material is warmed to about 50° to 60° C. The resultant impregnated glass mat including the coatings is about 10 to 12 mils thick. The slight residual tack of the surface is overcome by dusting with finely powdered mica. A one inch wide strip is slit and wound on itself as a helix on a core to provide a roll of curable impregnated glass cloth tape useful for purposes of insulation or to produce a tube. If stored cool there is no difficulty of self adhesion of successive layers, however, for ordinary treatment a polyethylene lining strip is desirably included.

The tape is tightly wound helically around a copper bar about ½ inch in diameter and adjusting the pitch of the helix so that edges of the tape overlap by about ¼ inch. The assembly is then heated at 120° C. for 2 hours to cure the polymeric composition completely. A tightly adherent electrically insulating coating is thus obtained. The mica employed to decrease tack is incorporated in the coating and produces no weakening of the structure. It will be evident that if a polyethylene liner is used it must be removed as the helical winding progresses. When higher temperatures are used for curing, less time is required.

Example 8

A solution of a composition of the invention which functions as a curable varnish is produced by dissolving 5 parts of the poly(glycidylsaccharin) described in Example 2 in 5 parts of ethylene glycol monomethyl ether and blending thoroughly with a solution of 6.1 parts of dimeric linoleylamine in a further 5 parts of ethylene glycol monomethylether. This fluid composition has about the consistency of spar varnish and can be applied by usual methods. It has a useful pot life, after addition of the amine, of about 2 hours. A plywood panel (exterior type, resin bonded) about 12 inches square and ¼ inch thick is coated with the varnish by brushing and is then dried. The coating cures in about 24 hours at room temperature to a firmly adherent tough protective film. Slight warming after evaporation of the solvent markedly decreases the time of hardening. The durability of the coating is demonstrated by immersing the coated panel in sea water (off the coast of Florida) to determine resistance to attack by sea water and suspended solids. After 8 months no visible attack has penetrated to the wood although the panel is heavily fouled. Coatings of the same material in which marine toxicants are incorporated upon similar marine plywood squares show no fouling and clean varnish surfaces.

Other amines which can be incorporated into the poly-(glycidylsaccharin) solution in proportional stoichiometric amounts are, for example, metaxylylenediamine, hexamethylenediamine, ethylenediamine. Suitable solvents or diluents for such varnish compositions are, for example, dioxane and dimethylformamide.

Example 9

A mixture of 45 parts of bis saccharino-butane and 107 parts of the tris-N-(10-amino-4,7-dioxa-decyl)trisamide of trimeric linoleic acid of Example 4 is prepared by warming to about 50° C. and kneading the ingredients together. A portion is coated to about 6 mils thickness on a non-woven web of fibers of polyethylene terephthalate and heated at 300° F. The mixture gels in about 5–10 minutes, and is firm but slightly tacky after 30 minutes. The surface is dusted with finely powdered mica and the other surfaces coated to about 8 mils and the structure is then cured for a further 30 minutes at 300° F. It has a dielectric strength of about 590 volts per mil.

This material is suitable as an electrically insulating spacer.

Using a film of polyethylene terephthalate instead of the above web of the same material, coatings are applied as described which are 5 and 8 mils thick. After the second cure, this construction has a dielectric strength of about 610 volts per mil, and it is suitable for electrical insulation.

What is claimed is:

1. A condensation copolymer of an organic compound containing at least two benzosulfimido residues connected at the nitrogen atoms thereof through a linking group which is a substantially inert organic chain, with a polyfunctional primary organic amine in which the amino groups are attached to the remainder of the compound through methylene groups, said amine being free from functional groups capable of reacting with amino groups.

2. A copolymer of a compound of the formula:

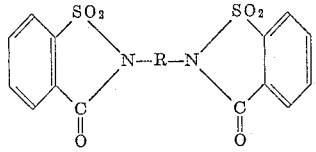

wherein R is a divalent linking radical having from 3 to 12 carbon atoms selected from the group consisting of alkylene, oxaalkylene and aralkylene radicals; with a polyfunctional primary amine in which the amino groups are attached to the remainder of the compound through methylene groups, the said amine being free from functional groups capable of reacting with amino groups.

3. A copolymer of a compound of the formula:

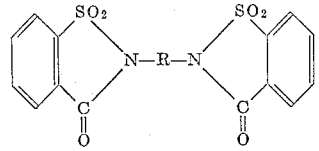

wherein R is a divalent radical containing from 3 to 12 carbon atoms of the group consisting of alkylene, oxaalkylene and aralkylene radicals; with an approximately stoichiometric amount of a polyfunctional primary amine of the formula:

$R_1(NH_2)_m$ wherein $m$ is an integer from 2 to 4 and wherein the amino groups are attached to the said radical through methylene groups; and $R_1$ represents an $m$-valent radical containing from 2 to 72 carbon atoms, selected from the group consisting of aliphatic and aromatic radicals which are free from functional groups capable of reacting with amino groups.

4. A copolymer of 1,4-bis-saccharinomethyl benzene with a polyfunctional primary amine in which the amino groups are attached to the remainder of the compound through methylene groups, the said amine being free from functional groups capable of reacting with amino groups.

5. A copolymer of 1,3-bis-saccharino propane with a polyfunctional primary amine in which the amino groups are attached to the remainder of the compound through methylene groups, the said amine being free from functional groups capable of reacting with amino groups.

6. A copolymer of 1,8-bis-saccharino-3,6-dioxaoctane with a polyfunctional primary amine in which the amino groups are attached to the remainder of the compound through methylene groups, the said amine being free from functional groups capable of reacting with amino groups.

7. A copolymer of 2,4-dimethyl-1,5-bis(saccharinomethyl)benzene with a polyfunctional primary amine in which the amino groups are attached to the remainder of the compound through methylene groups, the said amine being free from functional groups capable of reacting with amino groups.

8. A copolymer of polyglycidyl saccharin with a polyfunctional primary amine in which the amino groups are attached to the remainder of the compound through methylene groups, the said amine being free from functional groups capable of reacting with amino groups.

9. A copolymer of 1,4-bis-(saccharino)butane and tris-(3-aminomethylbenzylamino)triazine.

10. A thermally curable mixture consisting essentially of a mixture of about 40 to 60 mole percent of an organic compound containing at least two benzosulfimido residues connected at the nitrogen atoms thereof through a linking group which is a substantially inert organic chain, with from about 60 to 40 mole percent of a polyfunctional primary amine in which the amino groups are attached to the remainder of the compound through methylene groups, the said amine being free from functional groups capable of reacting with amino groups.

11. A thermally curable mixture consisting essentially of a mixture of about 40 to 60 mole percent of a compound of the formula:

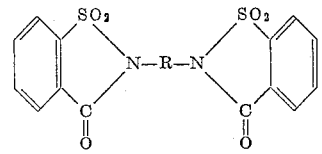

wherein R is a divalent linking radical having from 3 to 12 carbon atoms selected from the group consisting of alkylene, oxaalkylene and aralkylene radicals, with from about 60 to 40 mole percent of a polyfunctional primary amine of the formula:

$R(NH_2)_m$ wherein $m$ is an integer from 2 to 4 and $R_1$ represents an $m$-valent radical containing from 2 to 72 carbon atoms, and wherein the amino groups are attached to the said radical through methylene groups; selected from the groups consisting of aliphatic and aromatic radicals which are free from functional groups capable of reacting with amino groups.

References Cited in the file of this patent

UNITED STATES PATENTS

| | | |
|---|---|---|
| 2,401,155 | Hentrich | May 28, 1946 |
| 2,833,753 | Lai | May 6, 1958 |